United States Patent Office 2,969,383
Patented Jan. 24, 1961

2,969,383

HYDROCARBON ALUMINUM OR BORON SULFATES AND SULFONATE

Harris E. Petree, Baton Rouge, La., assignor to Ethyl Corporation, New York, N.Y., a corporation of Delaware No Drawing. Filed July 30, 1958, Ser. No. 751,826

13 Claims. (Cl. 260—448)

The present invention is concerned with novel compositions and a process for their preparation, particularly organo aluminum or boron sulfate and sulfonate compounds.

It has been known for quite some time that organometallic compounds of boron and aluminum can be prepared. For example, a well known process for the preparation of organo aluminum compounds involves the reaction of an organic halide with aluminum or an alloy thereof to form the organic aluminum halide and subsequent reaction of this material with a reducing agent, particularly sodium, to result in the triorgano aluminum compound. A process for the preparation of organo boron compounds involves the reaction of a boron hydride with an olefin to produce the corresponding alkyl boron compound. More recently organo aluminum compounds have been prepared by the reaction of aluminum, hydrogen, and an olefin in the presence of a trialkyl aluminum compound. While these processes are of merit in producing a carbon to metal bond, the materials formed are hazardous by virtue of their flammability. As far as now known, no boron or aluminum compounds in which the metal is bonded to carbon and additionally to a sulfate or organic sulfonate anion have been produced. It is desirable to provide additional organo boron and aluminum compounds other than those heretofore available in a more economical and useable form.

Accordingly, an object of this invention is to provide novel compositions of matter and a process for their manufacture. A particular object is to provide novel organo boron and aluminum sulfate or sulfonate compounds and a novel process for their manufacture. These and other objects will be evident as the discussion proceeds.

The above and other objects of this invention are accomplished by providing novel organo aluminum and boron compounds. Such compounds are characterized by having at least one metal to carbon bond and the metal is also linked to oxygen of the sulfate or sulfonate anion. The novel compositions are produced by reacting an organo aluminum or boron halide with an organic ester of sulfuric or an organic sulfonic acid. The preferred organo aluminum and boron sulfate and sulfonate compounds are those wherein the organo groups are hydrocarbon, especially alkyl hydrocarbon, and the metal is aluminum. Consequently a particularly preferred embodiment of the process of this invention involves the reaction of an alkyl aluminum halide, preferably chloride, bromide or iodide with an alkyl ester of sulfuric or alkyl sulfonic acid. The reaction is generally conducted at temperatures of about 50 to 150° C.

The process provides novel organo aluminum and boron sulfate and sulfonate compounds for the first time. Such compounds are of considerable utility possessing unique properties which will be discussed more fully hereinafter. Such unique properties result in more diversified and greater use of these materials than the previously known organo aluminum and boron compounds. Other advantages of the compounds and process of this invention will be brought forth as the discussion proceeds.

The novel compositions comprise organo aluminum or boron sulfate and sulfonate compounds. By way of further description, such compounds include aluminum or boron which is linked to at least one organic radical through carbon and to oxygen of a sulfate or sulfonate moiety. The sulfate anion can also have an organic radical attached to one of the oxygen atoms. The compounds can be depicted by the following formula:

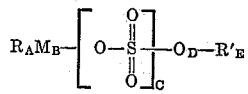

wherein R and R' are organic radicals, preferably hydrocarbon, and M is boron or aluminum. The above formula describes mono organo aluminum and boron sulfates when A, B, C, and D are equal to 1 and E is equal to zero; di-organo aluminum and boron sulfates when A is equal to 4 and B, C, and D are equal to 2, and E is equal to zero; mono organo aluminum and boron organo sulfates when A and B equal 1, and C, D, and E equal 2; di-organo aluminum or boron organo sulfates when A equals 2, B, C, D, and E equal 1; mono organo aluminum or boron sulfonates when A and B equal 1, C and E equal 2, and D equals zero; and di-organo aluminum and boron sulfonates when A equals 2, B, C, and E equal 1, and D equals zero. The radicals R and R' include both aliphatic and aromatic radicals preferably containing up to about 30 carbon atoms. Included among the compositions of this invention are, for example, ethylaluminum sulfate (EtAlSO$_4$); bis-diethylaluminum sulfate [(Et$_2$Al)$_2$SO$_4$]; bis-dimethylaluminum sulfate [(Me$_2$Al)$_2$SO$_4$]; ethylaluminum dodranti-sulfate [Et$_6$Al$_4$(SO$_4$)$_3$]; methylaluminum dodranti-sulfate; octadecylaluminum sulfate (C$_{18}$H$_{37}$AlSO$_4$); bis-divinylaluminum sulfate [(C$_2$H$_3$)$_2$Al]$_2$SO$_4$; bis-dibutadienylaluminum sulfate [(C$_4$H$_5$)$_2$Al]$_2$SO$_4$; 1-hexenylaluminum sulfate (C$_6$H$_9$AlSO$_4$); bis-dicyclohexylaluminum sulfate

[(C$_6$H$_{11}$)$_2$Al]$_2$SO$_4$ bis-diphenylaluminum sulfate [(C$_6$H$_5$)$_2$Al]$_2$SO$_4$; benzylaluminum sulfate (C$_7$H$_7$AlSO$_4$); diethylaluminum benzenesulfonate (Et$_2$AlOSO$_2$C$_6$H$_5$); dioctylaluminum p-toluenesulfonate [(C$_8$H$_{17}$)$_2$AlOSO$_2$C$_6$H$_4$CH$_{3-p}$]; divinylaluminum methanesulfonate (C$_2$H$_3$)$_2$AlOSO$_2$CH$_3$; dicyclohexylaluminum ethanesulfonate (C$_6$H$_{11}$)$_2$AlOSO$_2$C$_2$H$_5$ diphenylaluminum benzenesulfonate (C$_6$H$_5$)$_2$AlOSO$_2$C$_6$H$_5$ and the like sulfonates; diethylaluminum ethylsulfate Et$_2$AlOSO$_2$OEt)

dihexylaluminum hexylsulfate

[C$_6$H$_{13}$)$_2$AlOSO$_2$OC$_6$H$_{13}$]

diethylaluminum para-toluenesulfonate (Et$_2$AlOSO$_2$C$_7$H$_7$)

and the like sulfate and sulfonate compounds wherein boron is substituted for aluminum. The hydrocarbon aluminum and boron sulfate and sulfonate compounds are particularly preferred, especially those in which the carbon groups are alkyl groups having up to and including about 6 carbon atoms, because of their greater reactivity. The aluminum compounds are especially preferred since such compounds are more economical and of even greater stability than are the boron compounds. Additionally, the sulfate compounds are likewise preferred over the sulfonate compounds because the former are more efficient self-combustible materials.

The novel compositions of this invention are prepared by reacting an organoaluminum or boron halide with an organo sulfate or organo sulfonate; that is, an organic ester of sulfuric acid or an organo sulfonic acid. Such compounds can be depicted by the following structural formulae:

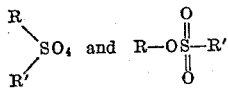

wherein R and R' have the meaning described hereinbefore. Typical examples of such esters include dimethyl sulfate, diethyl sulfate, dihexyl sulfate, dieicosyl sulfate, ethyl methyl sulfate, ethyl hexyl sulfate, divinyl sulfate, diethynyl sulfate, diphenyl sulfate, dibenzyl sulfate, dinaphthyl sulfate, dicyclohexyl sulfate, methyl methanesulfonate, hexylhexanesulfonate, ethyl methanesulfonate, cyclohexenyl benzenesulfonate, phenyl benzenesulfonate, ethyl p-toluenesulfonate, and the like. The hydrocarbon portion of such sulfates and sulfonates can of course be further substituted as long as such substituents are inert in the reaction. However, in general, the hydrocarbon sulfates and sulfonates particularly, hydrocarbon alkyl sulfates having up to about 6 carbon atoms in each alkyl group, are preferred because of their greater availability, economy, and applicability to the process. The sulfates are especially preferred because of their economy and easy preparation. Dimethyl and diethyl sulfate are especially preferred embodiments because of the superior results obtained when such are employed.

The organo aluminum and boron halides employed in the reaction are well known materials and in general those in which the organo radicals contain up to and including about 30 carbon atoms are employed. Such compounds can be depicted by the formula

wherein R is an organo radical; M is boron or aluminum, and "n" is a small whole number equal to 1 or 2 and X is a halogen; namely chlorine, bromine, iodine or fluorine. Included among such compounds are, for example, diethylaluminum chloride, bromide, iodide and fluoride; ethylaluminum dichloride, ethylaluminum sesqui-chloride, octylaluminum dichloride, dioctadecylaluminum bromide, divinylaluminum iodide, dicyclohexylaluminum bromide, diphenylaluminum bromide, dibenzylaluminum chloride, ethylmethylaluminum chloride and the like organo metal halide compounds wherein boron is substituted for aluminum. The hydrocarbon boron and aluminum halides, especially alkyl hydrocarbons having up to and including about 6 carbon atoms are preferred because of their greater reactivity and applicability in the process. Likewise, the preferred metal is aluminum as discussed previously and chlorine, bromine and iodine are the preferred halides, especially chlorine and bromine.

The process is generally conducted at a temperature between about 0 to 200° C. The preferred operating temperature is between about 50 to 150° C. for best results. Below 50° C. slow reaction will occur. Above about 150° C. secondary reactions such as decomposition may take place and no special advantage in reaction rate and yield is obtained.

A by-product of the reaction is the formation of alkyl halide, this material is readily recovered by distillation or evolved as a gas during the reaction and recycled for use in formation of the alkyl metal halide compound. For example, when ethyl chloride is the by-product vaporized from the reaction mixture, it is recycled for reaction with finely divided aluminum to form ethylaluminum sesquichloride. Alternatively, the alkyl metal halide can be prepared and reacted in situ by reacting the metal with the organic halide and organic ester of sulfuric or organo sulfonic acid simultaneously. The former procedure is preferred however. A general procedure for the reaction is to add the alkyl metal halide to the reactor along with an inert diluent, if desired, then heat the reactor to the desired temperature and add the organic sulfate or sulfonate thereto. At the completion of reaction, the mixture is subjected to vacuum conditions in order to remove volatiles and solvent and the solids remaining in the reactor, the organo metal sulfates or sulfonates, are in highly pure form ready for use.

The process of this invention is further demonstrated by the following examples wherein all parts are by weight.

*Example I*

To a reactor equipped with internal agitation, external heating means, a reflux condenser and a means for admitting reactants and products was added 83.2 parts of ethylaluminum sesqui-chloride (a mixture of ethylaluminum dichloride and diethylaluminum chloride generally designated as, $Et_3Al_2Cl_3$) and 250 parts of trimethylhexane. The reactor was then heated to 60 to 68° C. and 77.6 parts of diethyl sulfate were added thereto over a period of ½ hour. The reactor was next heated to 130° C. over a period of 1¼ hours and maintained at this temperature for ½ hour. During this entire period EtCl was evolved and recovered in near-quantitative yield by condensing in a trap. The reaction mixture was then cooled and a vacuum drawn on the system reducing the pressure to 3½ millimeters of mercury with agitation to remove the trimethylhexane. The solids remaining in the reactor were dried with stirring for 1 hour at 75° C., 93½ parts were obtained representing a yield of 98 percent. The product was a white powder. Analysis of this product by gas evolution indicated 1½ equivalents evolved, or 100 percent theory of the theoretical calculated for ethylaluminum dodranti-sulfate, $Et_6Al_4(SO_4)_3$. Elemental analysis showed the amount of aluminum and sulfate to be within experimental error of the theoretical amounts required.

*Example II*

Employing the reactor of the preceding example, a suspension of 16.3 parts of the ethyl ester of p-toluenesulfonic acid in about 150 parts of trimethylhexane at 65 to 75° C. was added over a period of ½ hour to a solution of 9.81 parts of diethylaluminum chloride in 40 parts of trimethylhexane. The temperature was then maintained between 96 to 134° C. for 1 hour and 25 minutes. During the course of the reaction 91 percent of the calculated volume of ethyl chloride gas was evolved and collected. The slurry of product was then distilled at 60–75° C. under reduced pressure of 0.5 millimeter of mercury and the residual solids were dried for 2½ hours at 75° C. and 0.3 millimeter pressure. The dried product consisted of 19.43 parts or 94 percent yield of a white solid which was reactive with alcohol and water. When a portion thereof was subjected to gas evolution analysis essentially the quantitative amount required for the compound diethylaluminum-p-toluenesulfonate ($Et_2AlOSO_2C_7H_7$) was evolved. When subjecting another portion of the compound to elemental analysis 10.06 percent aluminum was found whereas the calculated amount of aluminum is 10.53 for the aforementioned compound. Another portion was fused with sodium peroxide in a Parr bomb (to oxidize the p-toluenesulfonate anion to sulfate). Based on the weight of sample fused, a sulfate content of 37.9 percent was found whereas the calculated value is 37.5 percent.

Similar results are obtained when other sulfonates are substituted in the above example, e.g. ethyl ethanesulfonic acid, phenyl benzene sulfonic acid, methyl methanesulfonic acid, and the like.

*Example III*

To the reactor of Example I was added 20.3 parts of methylaluminum sesquibromide ($Me_3Al_2Br_3$) in 175 parts of dry trimethylhexane at 66° C. and 11.4 parts of dimethylsulfate were added dropwise during ½ hour. The resulting mixture was heated over a period of 2½ hours from 66° C. to 134° C. During the reaction methyl bromide gas was evolved in amount equivalent to 90 percent of the theoretical. The reaction mixture was then filtered with the residue being dried at 60 to 70° C. and 0.5 millimeter pressure for 4 hours. The white solid product comprised 14.07 parts or 96 percent of the theoretical. Subjecting a portion of the product to gas evolution analysis, 276 milliliters of gas were evolved from a one gram sample which amounts to 96.2 percent of the theoretical amount for $Me_6Al_4(SO_4)_3$. Subjecting another portion of the product to elemental analysis, aluminum and sulfate content was obtained within experimental error of the theoretical.

Example IV

To a reactor containing 27.4 parts of dimethylaluminum bromide ($Me_2AlBr$) in 250 parts of trimethylhexane at 60–70° C. with vigorous agitation was added dropwise 12.6 parts of dimethyl sulfate utilizing 15 minutes for the total addition time. The temperature was gradually increased and maintained at 126 to 130° C. for 4½ hours. During reaction, 17.7 parts of evolved and condensed gas were collected representing 93 percent of the theoretical of methyl bromide. The reaction mixture was cooled and filtered and the solids dried for 5 hours at 70 to 80° C. under 0.5 millimeter pressure to remove solvent. A white powder remained which amounted to 20.4 parts or 97 percent of the theoretical. When subjecting a portion of this product to gas evolution analysis an essentially quantitative amount of gas was evolved. Elemental analysis indicated 24.95 weight percent aluminum, 44.73 percent sulfate whereas $(Me_2Al)_2SO_4$ contains 25.67 percent aluminum and 45.71 percent sulfate.

Example V

To the reactor was added 37.15 parts of ethylaluminum dichloride dissolved in 300 parts of trimethylhexane. With the temperature of the reaction mixture at 63 to 69° C., 45.1 parts of diethyl sulfate were added with stirring over a period of 45 minutes. The temperature was then gradually raised over a period of 2 hours to 129° C. and maintained at this temperature for 15 minutes. At the end of this period the theoretical quantity of by-product gas (ethyl chloride) had been evolved. The reaction mixture was filtered and the yellow residue remaining was washed with hexane and petroleum ether then dried at 0.3 millimeter pressure at 25° C. A white powder remained, 45.9 parts, which is essentially the theoretical amount. Gas evolution and elemental analysis indicated the formation of ethylaluminum sulfate ($EtAlSO_4$).

Example VI

Employing the apparatus of the previous examples there was placed therein 24.42 parts of diethylaluminum chloride in 250 parts of dry trimethylhexane. The reactor was heated to 61° C. and then 15.51 parts of diethyl sulfate were added thereto dropwise over a period of ½ hour while maintaining the temperature at 61 to 70° C. At the end of this addition period the reaction mixture was heated over a period of 1½ hours to 128° C. and maintained between 128 to 132° C. for 1 hour with continuous agitation. After 15 minutes at this temperature no further evolution of gas was noted. At the end of the designated reaction period, the reaction mixture was transferred to a distillation column and the solvent distilled under reduced pressure. The solid product remaining was dried at 65° C. and 0.3 millimeter pressure for 1½ hours. Twelve parts of condensed by-product gas (ethyl chloride) was recovered, representing a yield of 92.3 percent. The product was a white powder amounting to 23.7 parts, representing an 88 percent yield. A portion thereof upon exposure to air turned yellow and began to smoke. Adding methyl alcohol thereto caused hydrolysis and ignition. Subjecting another portion of the product to gas evolution analysis a theoretical amount of gas was obtained for $(Et_2Al)_2SO_4$. Another portion was hydrolyzed by employing isopropyl alcohol. There was obtained 19.66 weight percent aluminum and 36.7 weight percent sulfate which corresponds to the theoretical amount of 20.2 percent aluminum, 36 percent sulfate in the compound $(Et_2Al)_2SO_4$.

Example VII

The procedure of Example I is repeated with exception that diphenylaluminum iodide is substituted for the ethylaluminum sesqui-chloride and diphenyl sulfate is substituted for the diethyl sulfate. The reaction temperature employed is 150° C. for 3 hours. Bis-diphenylaluminum sulfate $[(C_6H_5)_2Al]_2SO_4$ is obtained in high yield.

Example VIII

Example IV is repeated with exception that dicyclohexylaluminum chloride is reacted with dicyclohexyl sulfate at 125° C. for 6 hours employing the dimethyl ether of diethylene glycol as a diluent. Bis-dicyclohexylaluminum sulfate is obtained in high yield.

Example IX

Employing the procedure of Example V when 13 parts of vinyl aluminum dichloride are reacted with 15 parts of divinyl sulfate in the presence of 0.5 part of triethylamine for 3 hours at 125° C., vinylaluminum sulfate ($C_2H_3AlSO_4$) is obtained in high yield.

Example X

Substituting ethylboron dichloride for diethylaluminum chloride in Example VI, bis-diethylboron sulfate $[(Et_2B)_2SO_4]$ is produced in high yield.

Example XI

Example III is repeated substituting methylboron sesqui-chloride for the methylaluminum sesqui-bromide and pyridine for the trimethyl hexane with the reaction being conducted at 150° C. for 5 hours. Methylboron dodrantisulfate, $Me_6B_4(SO_4)_3$, is obtained in high yield.

Example XII

When diethyl sulfate is reacted with diethylaluminum chloride in equimolar amount at 95° C. for 2 hours, diethylaluminum ethyl sulfate ($Et_2AlOSO_2OEt$) is obtained in high yield.

Example XIII

Butadienylaluminum sulfate ($C_4H_5AlSO_4$) is obtained in high yield when Example V is repeated employing dibutadienyl sulfate in place of diethyl sulfate and butadienylaluminum dichloride in place of ethylaluminum dichloride.

It is not essential that the organo groups on the sulfate or sulfonate ester be identical to the organo groups on the organo metal halide compound. The following example will demonstrate a reaction wherein dissimilar groups are employed.

Example XIV

Example I is repeated with exception that dimethyl sulfate is employed in place of diethyl sulfate. Ethylaluminum dodrantisulfate is obtained in high yield, in addition to methyl chloride by-product.

Likewise, the organo radicals on the organic metal halide can be dissimilar or asymmetrical. For example, Example I can be repeated employing ethyl-methylaluminum chloride in place of ethylaluminum sesquichloride to produce bis-ethyl-methylaluminum sulfate, in addition to by-product ethyl chloride.

The above examples are given by way of illustration.

and it is not intended that the invention be limited thereby.

The reaction is generally conducted at atmospheric pressure. However, if desired, subatmospheric and super atmospheric pressures as up to as high as 150 atmospheres and higher can be employed. Autogenous or super atmospheric pressure is advantageous when any of the constituents of the reaction mixture are volatile at the temperature employed providing a means is included to facilitate the removal of the by-product alkyl halide as it is formed. On the other hand, in these instances reflux conditions can also be employed which serves for better heat control, more intimate admixture and enhancement in reaction rate.

Although solvents are not required these are advantageous as diluents to moderate the reaction, and are generally employed when the sulfates, sulfonates or organo metal compound is solid or insoluble in the reaction mixture. For such purposes the usual organic solvents can be employed with the general criteria being that they be essentially inert in the reaction and liquid under reaction conditions. Included among such solvents are the hydrocarbons, ethers and tertiary amines. Typical examples of such solvents include the aliphatic hydrocarbons, such as the hexanes, octanes, nonanes, octadecanes, cyclohexanes, and the like hydrocarbons. Among the tertiary amines which can be employed are included the tertiary, alkyl, aryl and cyclic amines. Typical examples of such amines include methylpyridine, amyl-diphenyl-amine, p-isobutyl-dimethyl-aniline, triphenylamine, tricyclohexyl-amine, triethylamine, trimethylamine and the like. Included among such ethers are the aliphatic and the polyethers. The aliphatic ethers include the monoaliphatic and mixed ethers. Typical examples of the monoaliphatic ethers included are di-n-butyl ether; di-sec-butyl ether; diisobutyl ether; di-n-amyl ether; di-n-heptyl ether; tetrahydrofuran; and the like saturated and unsaturated ethers. Examples of the mixed ethers which are employed are n-amylmethyl ether; tert-amylethyl ether; n-butyl-isopropyl ether; ethylisoamyl ether; n-butyl-n-propyl ether and the like. Examples of the polyethers which are employed are those having the configuration $$R-O-(CH_2)_n-O-R$$

wherein R is an organic radical, preferably aliphatic hydrocarbon or ether radical, and $n$ is a small whole number as between about 1 to 10, preferably 1 to 3 inclusive. For example, such polyethers include ethylene glycol ethylmethyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. The aliphatic hydrocarbons and polyethers are particularly preferred solvents because of their economy, greater availability and ready removal from the reaction system.

The proportions of the reactants employed in preparing the compositions of this invention can be varied over a wide range. In general between about ½ to 3½ moles of the organo metal halide per mole of the organic sulfate or sulfonate are employed for best results. In order to effect most efficient reaction and economy essentially the stoichiometric amounts of each reactant are employed. In a more specific embodiment when employing the sulfate esters, in order to have a greater yield of compound having sulfate anion, it is preferable to operate at temperatures above 100° C. with at least 2 moles of the organo metal halide per mole of the organic sulfate ester. To obtain organo metal organo sulfate product, it is preferable to employ 1 or less moles of the organo metal halide compound per mole of organic sulfate ester at temperatures below 95° C.

The compositions of this invention are of considerable utility. A particular unique use therefor is as a mono- propellant fuel. That is, these materials can be caused to ignite in the absence of an oxygen-containing atmosphere and will readily burn providing energy for various uses especially creating a thrust which can be employed for the propulsion of various devices including, for example, rockets.

To illustrate this particular use, the following example is presented.

Example XV

A tube was employed in which electrical wiring was provided having a resistive coil in proximity to the charge of organo metal sulfate placed in the tube. Then 2 parts of bis-dimethylaluminum sulfate produced in Example IV were added to the tube while a rapid nitrogen flush was maintained. Next, current was applied to the coil to bring it to red heat whereby the bis-dimethylaluminum sulfate ignited and burned rapidly providing a thrust to the discharge end of the tube. Little ash remained. Similar results were obtained when the same procedure was followed employing methylaluminum dodranti-sulfate, bis-diethylaluminum sulfate and ethylaluminum dodranti-sulfate. The latter material exhibited a more uniform and extensive but slower burning, leaving some ash.

Another particular advantageous use of the compounds of this invention is in the preparation of organolead compounds. The following example will demonstrate such use.

Example XVI

To an autoclave was added 35 parts of lead diacetate and 27 parts of bis-diethylaluminum sulfate and 100 parts of dimethyl ether of the diethylene glycol. The reaction mixture is heated to 100° C. and maintained at this temperature for one hour. At the end of this period it is cooled to room temperature and water slowly added thereto. Tetraethyllead is obtained in high yield by decanting the water layer therefrom.

The lead salts of organic acids are particularly preferred in the above use of the compounds of this invention because of the higher yields of organolead product obtained. In general, any lead salt of an organic acid including alcoholates and thioalcoholates which exhibit acid characteristics are employable although the lead salts of alkanoic acids having up to about 6 carbon atoms are generally most advantageous. Other lead compounds can also be employed including the halides, oxides, and sulfides, the oxides and sulfides being preferred over the lead halides because of their less destructiveness of the product produced.

The products of this invention are generally more stable than other organometallic compounds. However, they are susceptible to inflammability and degradation when exposed to moist atmosphere. Accordingly, in all operations in which they are employed and in handling these materials, an inert atmosphere is generally used. For this purpose inert atmospheres, such as a vacuum, the rare gases including argon, neon, krypton, and nitrogen are used to prevent reactivity of the compound. Further, since the compounds are capable of self-sustaining combustion-decomposition, care should be taken to maintain them at a temperature below the ignition temperature, generally below about 200° C., in order to avoid violent explosions.

Having thus described the novel compositions of this invention and a process for their manufacture, it is not intended that the invention be limited except as set forth in the following claims.

I claim:

1. New compositions of matter selected from the group consisting of hydrocarbon metal sulfate and sulfonate wherein the metals are selected from aluminum and boron, and said hydrocarbon group contains up to and including about 18 carbon atoms.

2. Bis-diethylaluminum sulfate.

3. Ethylaluminum dodranti sulfate.

4. The process which comprises reacting a material selected from the group consisting of a hydrocarbon sulfate and hydrocarbon sulfonate with a hydrocarbon aluminum halide wherein each of said hydrocarbon groups contains up to and including about 18 carbon atoms.

5. The process for the manufacture of bis-diethylaluminum sulfate which comprises reacting diethylaluminum chloride with diethyl sulfate.

6. A process which comprises reacting a material selected from the group consisting of a hydrocarbon sulfate and hydrocarbon sulfonate with a hydrocarbon metal halide wherein the metal is selected from the group consisting of aluminum and boron, and wherein each of said hydrocarbon groups contains up to and including about 18 carbon atoms.

7. The process of claim 6 wherein the reaction is conducted at a temperature between about 0 to 200° C. and between about ½ to 3½ moles of said hydrocarbon metal halide are employed per mole of said hydrocarbon sulfate and hydrocarbon sulfonate.

8. The process of claim 5 further characterized in that the reaction is conducted at a temperature between about 0 to 200° C. and between about ½ to 3½ moles of said diethylaluminum chloride are employed per mole of said diethyl sulfate.

9. The process of claim 8 further characterized in that at least 2 moles of said diethylaluminum chloride is employed per mole of said diethyl sulfate.

10. The process of claim 7 wherein essentially the stoichiometric amount of the reactants is employed.

11. The process of claim 7 further characterized in that said hydrocarbon sulfate and hydrocarbon sulfonate is added to said hydrocarbon metal halide after the latter has been heated to the desired temperature.

12. The process for the manufacture of ethylaluminum dodranti sulfate which comprises heating about 83.2 parts by weight of ethylaluminum sesquichloride in trimethylhexane to a temperature between about 60 to 68° C., then adding about 77.6 parts by weight of diethyl sulfate thereto, and reacting the mixture at 130° C. while simultaneously recovering the evolved ethyl chloride by-product.

13. The process for the manufacture of bis-diethylaluminum sulfate which comprises preheating a mixture of about 24.42 parts by weight of diethylaluminum chloride in trimethylhexane to about 61° C., then adding about 15.51 parts by weight of diethyl sulfate thereto, and reacting the mixture at a temperature between about 128 to 132° C. while simultaneously recovering the by-product ethyl chloride.

References Cited in the file of this patent

Gilman: Organic Chemistry, vol. I, 2nd edition (1943), pages 510 and 553.